United States Patent [19]

Sakurai et al.

[11] Patent Number: 4,816,739
[45] Date of Patent: Mar. 28, 1989

[54] DC/DC CONVERTER

[75] Inventors: Tadashi Sakurai; Masahiro Kojima, both of Tokyo, Japan

[73] Assignee: Motorola, Inc., Schaumburg, Ill.

[21] Appl. No.: 232,190

[22] Filed: Aug. 15, 1988

[30] Foreign Application Priority Data

Sep. 10, 1987 [JP] Japan .................................. 62-225198

[51] Int. Cl.[4] .............................................. G05F 1/46
[52] U.S. Cl. ...................................... 323/272; 323/222; 363/65
[58] Field of Search ............... 323/222, 224, 266, 268, 323/271, 272; 363/21, 65, 124; 307/43, 58

[56] References Cited

U.S. PATENT DOCUMENTS

| | | |
|---|---|---|
| 3,913,000 | 10/1975 | Cardwell, Jr. ....................... 323/222 |
| 4,257,090 | 3/1981 | Kroger et al. ....................... 323/222 |
| 4,290,101 | 9/1981 | Hergenhan ............................ 363/65 |
| 4,595,873 | 6/1986 | Musil .................................... 323/222 |
| 4,648,020 | 3/1987 | Vinciarelli ........................... 323/272 |

Primary Examiner—Peter S. Wong
Attorney, Agent, or Firm—Michael D. Bingham

[57] ABSTRACT

A first converter which includes a switching element operating on a comparatively lower threshold voltage and generating a first output voltage, a second converter which includes a switching element operating on a threshold voltage higher than that of the first conversion unit and generating a second output voltage higher than the first output voltage, and a level shift circuit which provides the switching signal for activating the switching element of the second converter in accordance with generation of the first output voltage.

4 Claims, 1 Drawing Sheet

DC/DC CONVERTER

FIELD OF THE INVENTION

The present invention relates to a DC/DC converter and particularly to a DC/DC converter having high conversion efficiency, even when a low voltage power source is used, by utilizing a plurality of DC/DC conversion units.

BACKGROUND OF THE INVENTION

A conventional DC/DC converter generates a DC output voltage higher than the input power supply voltage, for example, by switching a current flowing into an inductor, with a switching element such as a MOS transistor, and then rectifying a reverse electromotive force generated in the inductor.

However, such a conventional DC/DC converter is formed using a single DC/DC conversion unit. Therefore, it has a disadvantage in that an element having a low threshold voltage must be used as the switching element in case an input supply voltage is rather low. In this case a high output voltage cannot be obtained since a withstand voltage of the switching element becomes low and, accordingly, the DC/DC converter cannot provide a high voltage step-up ratio. Conversely, use of a switching element having a high threshold voltage and a high withstand voltage to obtain a high output voltage brings about a problem that the conversion efficiency of the circuit becomes poor and the DC/DC converter does not start up in a stable mode.

SUMMARY OF THE INVENTION

It is therefore an object of the present invention, considering the problems in the conventional circuit described above, to obtain a high step-up ratio in a DC/DC converter without lowering the conversion efficiency, even in case the input supply voltage is slow, and to secure a stable and reliable start up function of the converter.

A DC/DC converter embodying the present invention comprises a first DC/DC conversion part or unit which includes a switching element operating at a comparatively low threshold voltage and generating a first output voltage ($V_1$), a second DC/DC conversion part or unit which includes a switching element operating at a threshold voltage higher than that of the first unit and generating a second output voltage ($V_2$), and a level shift circuit which provides a switching signal for activating a switching element of the second DC/DC conversion part in response to generation of the first output voltage.

When a power supply voltage, namely an input voltage, is supplied to a DC/DC converter having such a structure, the switching element of the first DC conversion unit switches in response to a switching signal supplied externally or a switching signal supplied from an oscillator provided within the DC/DC converter. Thereby, the first DC/DC conversion unit generates a higher output voltage ($V_1$) and supplies it to the level shift circuit. Thereby, the level shift circuit becomes ready to operate and applies the level-shifted switching signal to the switching element of the second DC/DC conversion unit, causing it to perform switching operations. Thus, the second DC/DC conversion unit generates, with the operation of the switching element thereof, the second output voltage ($V_2$) higher than the output voltage ($V_1$) of the first DC/DC conversion unit and supplies this second output voltage ($V_2$) to the other circuit, for instance, as an output of the DC/DC converter. When the second output voltage ($V_2$) exceeds a predetermined value, the level shift circuit provides a level shift operation based on the second output voltage ($V_2$) in place of the first output voltage ($V_1$) derived from the first DC/DC conversion unit. Therefore, operation of the first DC/DC conversion unit is suspended to limit unnecessary power consumption.

DETAILED DESCRIPTION OF THE INVENTION

An embodiment of the present invention will be explained with reference to the accompanying drawings.

Figure 1:
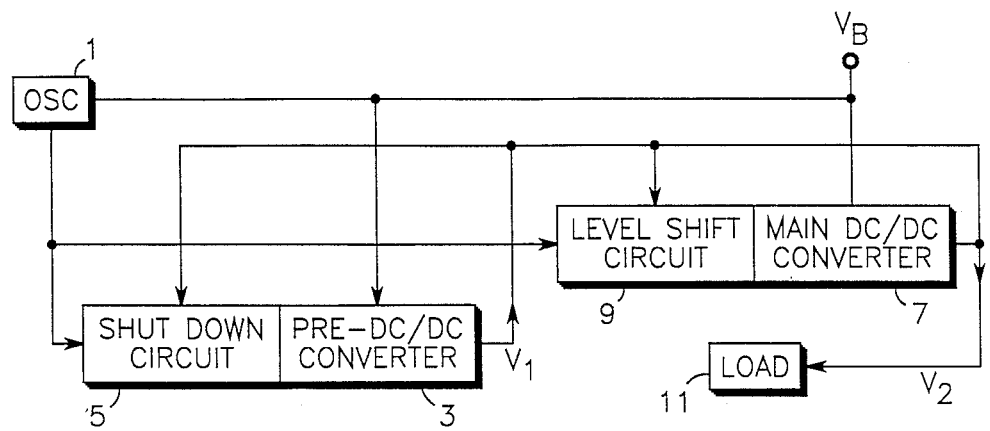
FIG. 1 is a block diagram of a DC/DC converter embodying the present invention.

FIG. 1 is a structure of a DC/DC converter embodying the present invention. The DC/DC converter comprises an oscillator 1 for generating a switching signal, a pre-DC/DC converter 3 as a first DC/DC conversion unit, a shut-down circuit 5, a main DC/DC converter 7 as a second DC/DC conversion unit and a level shift circuit 9. An output of main DC/DC converter 7 is connected with a load 11. Oscillator 1 may be provided within the DC/DC converter or an oscillator signal, namely a switching signal, may be supplied from an external circuit. Moreover, pre-DC/DC converter 3 uses a switching element having a low threshold voltage, while main DC/DC converter 7 uses a switching element having a comparatively higher threshold voltage.

In the circuit of FIG. 1, when an input voltage $V_B$ is applied, oscillator 1 first starts operation to generate the switching signal and supplies it to each DC/DC converter. At the beginning, since an output voltage $V_1$ of pre-DC/DC converter 3 is almost zero or lower than the predetermined value, shut-down circuit 5 does not operate and therefore the oscillation signal of oscillator 1, namely the switching signal, is supplied to pre-DC/DC converter 3. Accordingly, the switching element of pre-DC/DC converter 3 performs a switching operation and an AC signal obtained by this switching operation is rectified to develop output voltage $V_1$. When output voltage $V_1$ increases to a certain degree, evel shift circuit 9 operates and shifts the level of the switching signal output from oscillator 1, causing the switching element of main DC/DC converter 7 to perform a switching operation. Thereby, output voltage $V_2$, which is higher than output voltage $V_1$, is provided from the main DC/DC converter 7 and is then supplied to load 11. This output voltage $V_2$ is also supplied to level shift circuit 9 and thereby level shift circuit 9 continues the operation with output voltage $V_2$ in place of output voltage $V_1$. Therefore, output voltage $V_1$ is no longer required and power consumption can be saved by suspending operation of pre-DC/DC converter 3. Thus, when output voltage $V_1$ exceeds a predetermined value, or when output voltage $V_2$ exceeds a predetermined value, shut-down circuit 5 operates to prevent the switching signal from being applied to pre-DC/DC converter 3 by oscillator 1.

As explained above, the use of a plurality of DC/DC conversion units realizes effectively the generation of a high output voltage from a low input voltage. Moreover, in the circuit of FIG. 1, the DC/DC converter can be started with a considerable stability since a switching element of comparatively low threshold voltage can be used for pre-DC/DC converter 3. Furthermore since main DC/DC converter 7 is capable of introducing a switching element of a higher threshold voltage, output voltage $V_2$ can be increased sufficiently as required. In this embodiment, a pair of DC/DC conversion units are used in the circuit of FIG. 1, but the output voltage may be stepped up sequentially by increasing the number of DC/DC conversion units. In this case, a higher output voltage may be generated efficiently.

Figure 2:
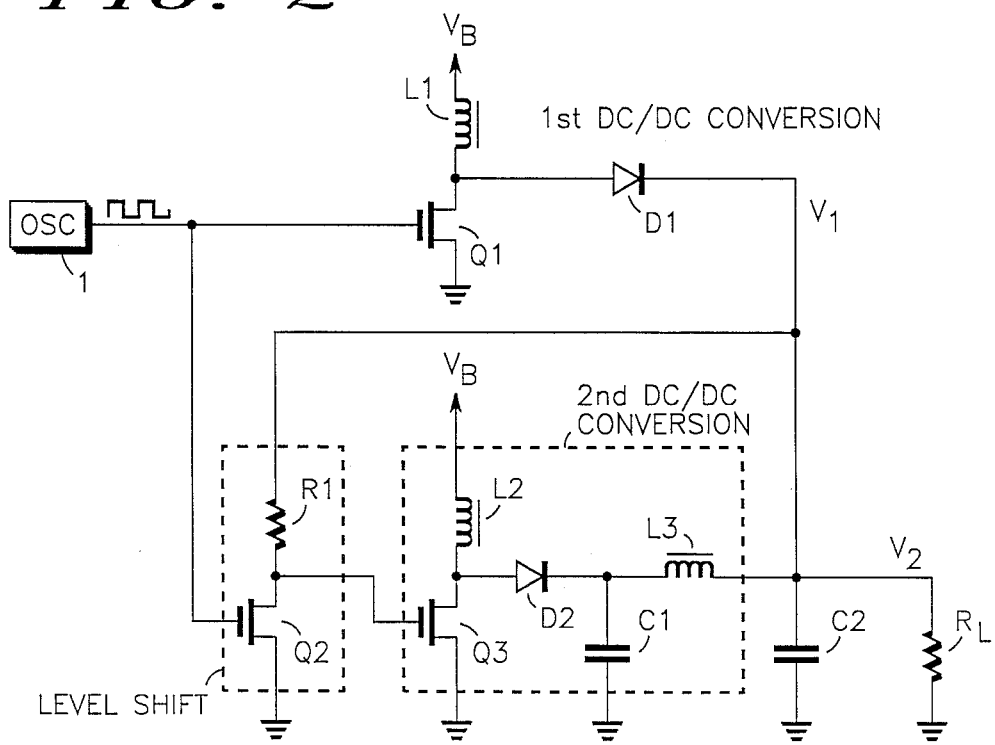
FIG. 2 is a schematic diagram of the principle structure of the DC/DC converter illustrated in the block diagram of FIG. 1.

FIG. 2 is a schematic diagram of the principle structure of the DC/DC converter of FIG. 1. This circuit comprises an oscillator 1, MOS transistors Q1, Q2, Q3, inductors L1, L2, L3, diodes D1, D2, capacitors C1, C2 and a resistor R1. A resistor $R_L$ is a load resistor. Transistor Q1, inductor L1, and diode D1 form a first DC/DC conversion unit corresponding to pre-DC/DC converter 3 of FIG. 1. Transistor Q2, and resistor R1 form a level shift circuit and transistor Q3, inductors L2, L3, diode D2, and capacitors C1, C2 form a second DC/DC conversion unit corresponding to main DC/DC converter 7 of FIG. 1. Capacitor C2 is used in common as a smoothing capacitor for the first DC/DC conversion unit and the second DC/DC conversion unit. In the present embodiment, power supply voltage $V_B$ is a battery with a voltage of 0.9V. Also, transistors Q1 and Q2 are low operating voltage MOS transistors with a threshold voltage as low as about 0.3V. In addition, transistor Q3 is a high withstand voltage transistor with a threshold voltage of about 1V.

In the operation of the circuit of FIG. 2, transistor Q1 is turned on or off with the switching signal supplied from oscillator 1 in accordance with application of the power supply voltage $V_B$. Thereby, a reverse electromotive force is generated by the electrical energy accumulated in the inductor L1. This reverse electromotive force is rectified and smoothed by diode D1 and capacitor C2, resulting in first output voltage $V_1$. Output voltage $V_1$ is, for example, a voltage of about 3.0V.

When output voltage $V_1$ increases, the level shift circuit comprising transistor Q2 and resistor R1 becomes ready for operation. Transistor Q2 is turned on and off with the switching signal generated from oscillator 1 and, thereby, a switching signal with expanded amplitude is generated and is then supplied to transistor Q3. Accordingly, transistor Q3 having a high threshold voltage also becomes ready for operation, turning on and off a current flowing into inductor L2 and generating a reverse electromotive force. This reverse electromotive force is rectified and smoothed by a rectifying and smoothing circuit including diode D2, capacitors C1, C2 and inductor L3 to develop output voltage $V_2$, which is supplied to load $R_L$. Output voltage $V_2$ is a voltage of about 5V-12V in this embodiment. When output voltage $V_2$ exceeds a predetermined value, it is used as the power supply voltage to be supplied to the level shift circuit in place of output voltage $V_1$ (see shut-down circuit 5 of FIG. 1). Thereafter, the operation of the first DC/DC conversion unit is suspended. Operation of the first DC/DC conversion unit can be suspended, for example, by connecting the shut-down circuit to the gate of transistor Q1, (not illustrated in FIG. 2) and removing the output of oscillator 1 from the gate of transistor Q1 by way of this shut-down circuit. The shut-down circuit can be formed, for example, by a comparison circuit which compares the amplitude of output voltage $V_1$ to $V_2$ of the DC/DC converter and an AND gate which passes or rejects an output signal of oscillator 1 corresponding to an output of this comparison circuit.

As described previously, according to the present invention, a high set-up ratio can be obtained without lowering conversion efficiency even from a low input voltage by using a plurality of DC/DC conversion units and selecting a threshold voltage of the switching element of the DC/DC conversion unit. The DC/DC converter of the present invention is also capable of staring the operation with high reliability even in case an input voltage is low and thus ensures the implementation of a power supply apparatus having remarkably high reliability.

What is claimed is:

1. A DC/DC converter comprising a first DC/DC conversion unit including a switching element operating on a comparatively low threshold voltage and generating a first output voltage, a second DC/DC conversion unit including a switching element operating on a threshold voltage higher than that of said first conversion unit and generating a second output voltage higher than the first output voltage, and a level shift circuit connected to receive the first output voltage and providing a switching signal to the switching element of said second DC/DC conversion unit for the operation of said second conversion unit in accordance with generation of the first output voltage.

2. A DC/DC converter according to claim 1, wherein said level shift circuit, in response to the second output voltage generated from the second DC/DC conversion unit exceeding a predetermined value, provides the level shift operation based on the second output voltage in place of the first output voltage.

3. A DC/DC converter according to claim 1 wherein the first DC/DC conversion unit includes a shut-down circuit coupled to receive the second output voltage and which suspends operation of the first DC/DC conversion unit after the second output voltage is provided from the second DC/DC conversion unit.

4. A DC/DC converter according to claim 1 including in addition a common oscillation source having an output connected to each of the switching elements of the first and second DC/DC conversion units and wherein each switching element of the first and second DC/DC conversion units performs the switching operation with a signal supplied from the common oscillation source.

* * * * *